UNITED STATES PATENT OFFICE.

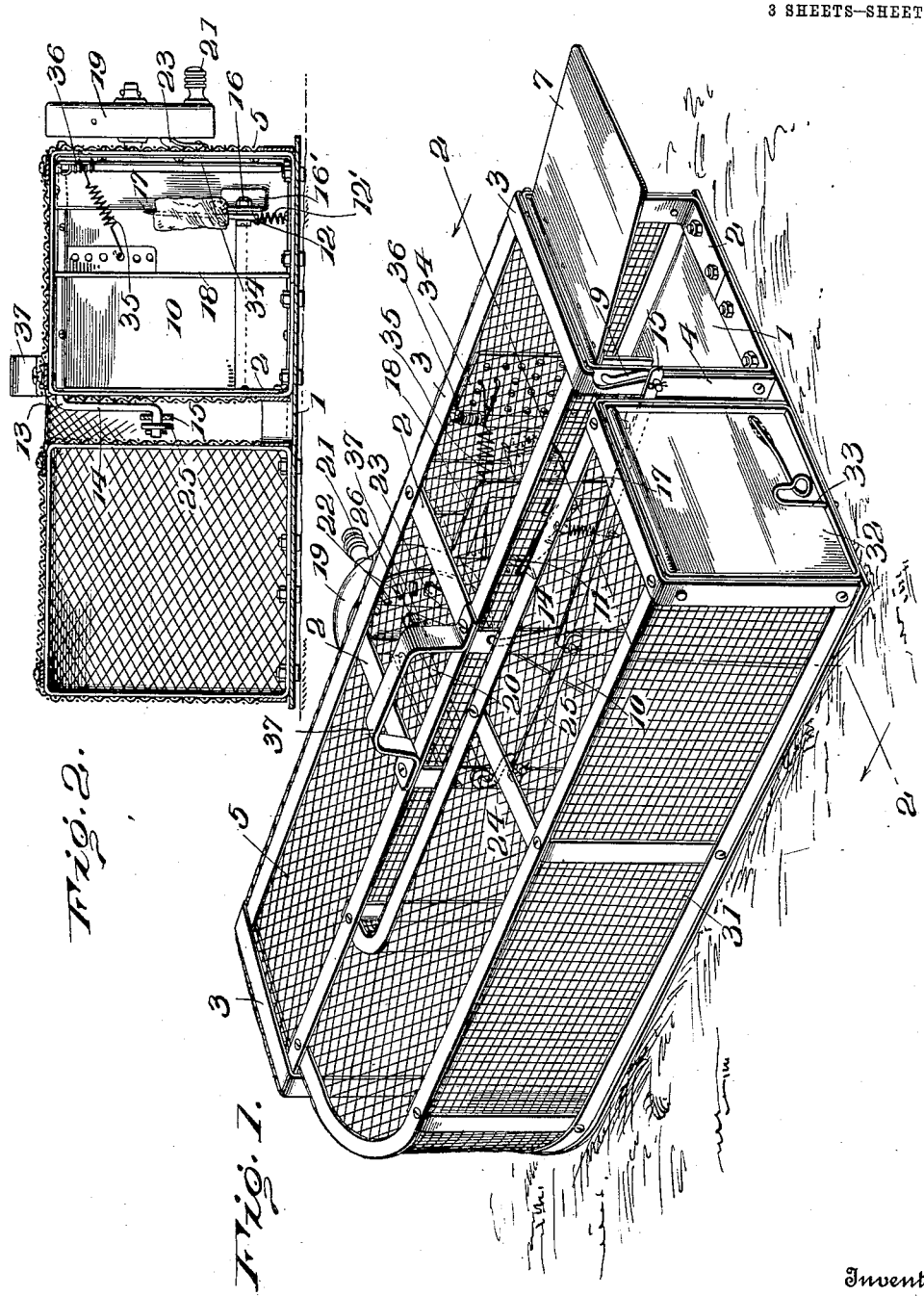

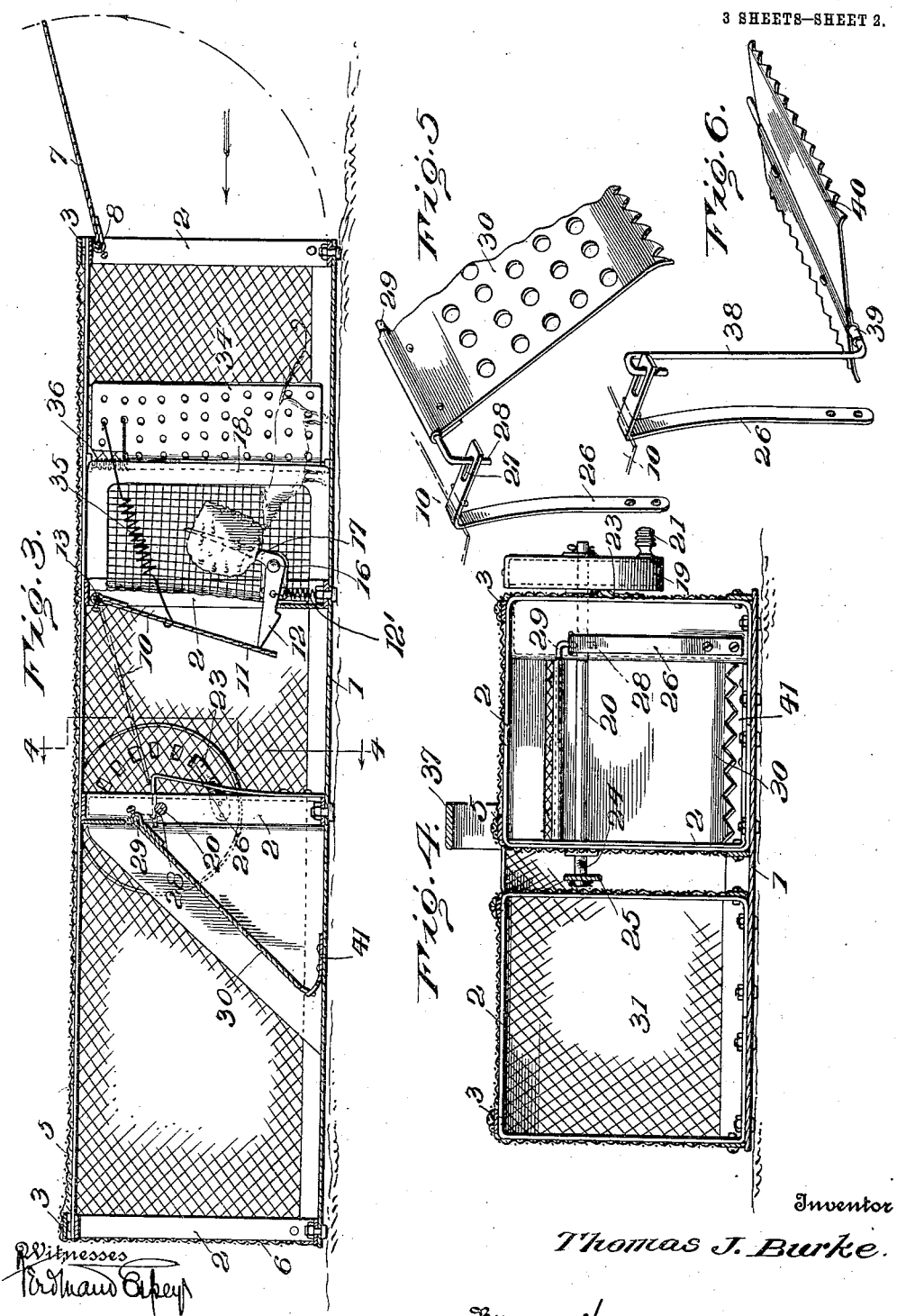

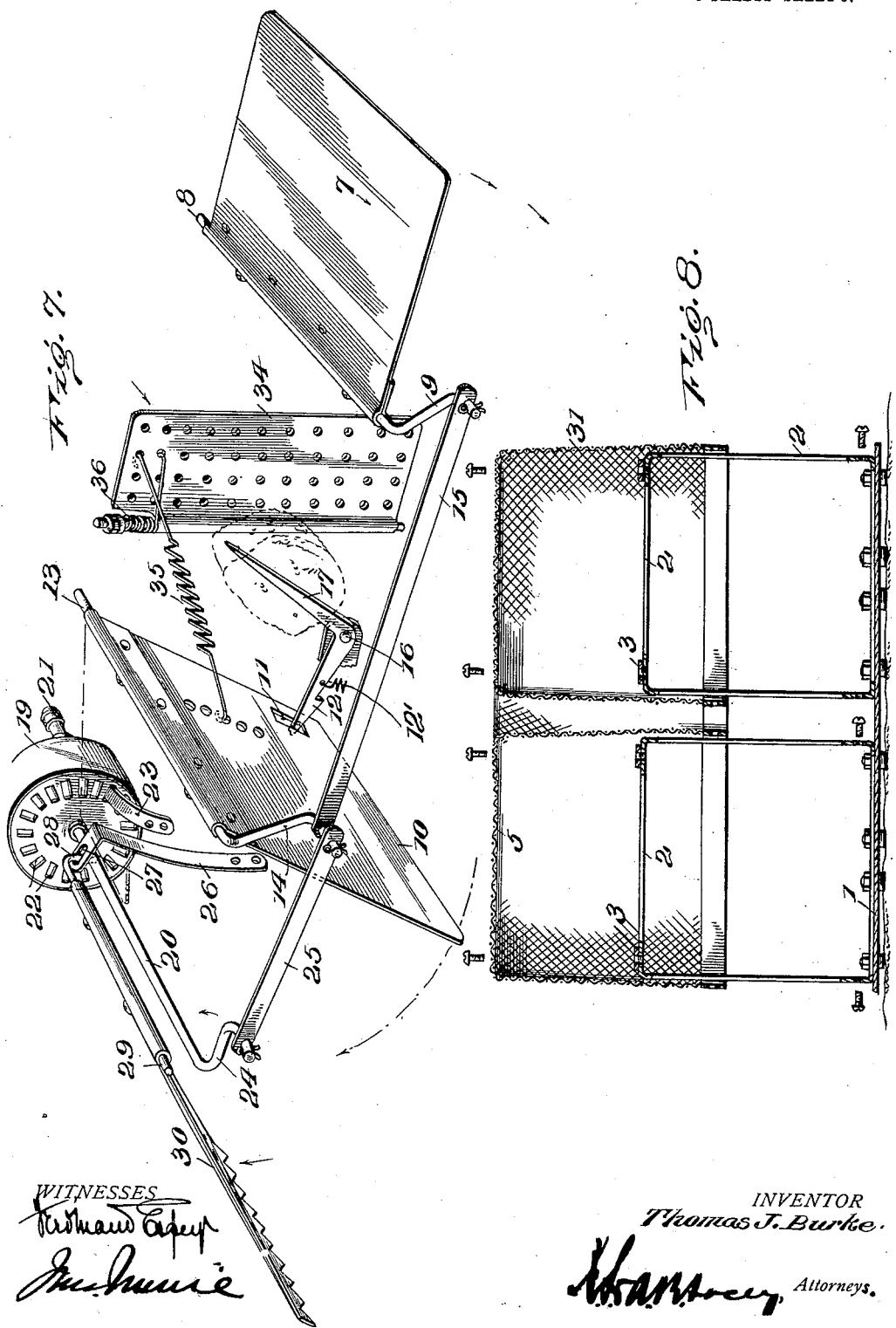

THOMAS J. BURKE, OF NEW ORLEANS, LOUISIANA.

ANIMAL-TRAP.

1,077,452. Specification of Letters Patent. Patented Nov. 4, 1913.

Application filed September 27, 1912. Serial No. 722,754.

*To all whom it may concern:*

Be it known that I, THOMAS J. BURKE, citizen of the United States, residing at New Orleans, in the parish of Orleans and State of Louisiana, have invented certain new and useful Improvements in Animal-Traps, of which the following is a specification.

This invention relates to animal traps, and has for its object the provision of a trap which will operate automatically in catching the animal and in being reset after an animal has been caught, and which will be positively operated to prevent the escape of the animal after he enters the trap.

A further object of the invention is to provide means to protect the bait and prevent loss of the same, and a further object of the invention is to provide a simple means for operating the several doors.

The invention also seeks generally to improve the construction and arrangement of traps to the end that the durability and efficiency thereof may be increased.

The stated objects, and such other incidental objects as will appear as the description of the invention proceeds, are attained in a trap of the character illustrated in the accompanying drawings, and the invention consists in certain novel features which will be hereinafter first fully described and then more particularly pointed out in the appended claims.

In the annexed drawings, Figure 1 is a perspective view of an animal trap embodying my improvements; Fig. 2 is a transverse section of the same taken on the line 2—2 of Fig. 1; Fig. 3 is a longitudinal section; Fig. 4 is a transverse section taken on the line 4—4 of Fig. 3; Fig. 5 is a detail perspective view showing the manner of releasing the trigger door so that it may return to its set position after having once been operated; Fig. 6 is a detail perspective view showing a modification of the means for releasing the trigger door; Fig. 7 is a perspective view showing the several doors and connections between the same in their proper relative positions but without the casing; Fig. 8 is a transverse section showing the manner of removing the cage from the frame.

In carrying out my present invention I employ a base-plate 1 which may be of any suitable material and of any desired dimensions. Upon this base-plate I secure at intervals vertical frames 2 which constitute supports for the several doors and the shafts for operating the same. These frames 2 are disposed at the ends of the base-plate and at intermediate points thereof, and a cage, consisting of transverse and longitudinal braces 3 and vertical posts 4 between the braces carrying a reticulated cover 5, is adapted to fit down over the said frames 2 and upon the base-plate, as will be readily understood.

The intermediate frames 2 and the frame at the front end of the trap constitute door frames, while the frame at the rear end of the trap is covered with reticulated material, as at 6, so as to form a closure for the cage. The entrance door 7 is hinged at the top of the door frame 2 by means of a shaft 8 journaled in the said frame and provided at one end with a crank arm or lever 9, the door being secured rigidly to said shaft between the sides of the door frame. A trigger door 10 is mounted in a similar manner at the upper end of the second door frame 2, and this trigger door extends across the cage and is provided near its lower end with a slot 11 which is adapted to receive a trigger or hook 12, whereby the door will be held normally in a lowered position. The shaft 13 carrying the trigger door is provided with a crank arm or lever 14 at one end, and the said crank arm or lever is connected by a link 15 with the crank arm or lever 9 on the front shaft 8. It will thus be seen that neither the entrance door nor the trigger door may be operated without causing a simultaneous operation of the other door.

The trigger or hook 12 is fitted upon a shaft 16, and a bait holder or pin 17 is rigid with the trigger. A spring 12' is attached to the trigger and to the bottom of the frame so that the trigger will be held normally in its lowered position in engagement with the trigger door so that the said door will be normally held in its closed position. The lower edge of the trigger is beveled at its end so that when the door swings to its closed position the lower end of the slot in the door will ride under the end of the trigger and lift the same against the tension of the spring 12', so that a shoulder or projection on the trigger will automatically drop into engagement with the door to hold the same in the closed position. The shaft or pivot 16 is mounted in a suitable bracket 16' within the trap between the side of the same and a longitudinal vertical partition 18, the bait holder projecting upwardly so that when the animal draws upon the bait he will rock the bait holder and lift the hook or trigger 12 out of engagement with the lower wall of the slot 11 in the trigger door. The said door will then at once swing upwardly under the influence of the operating spring, and through the connections just described will cause the entrance door to swing downwardly against the front door frame 2, and consequently close the front end of the trap and thereby cut off the escape of the animal.

The operating spring is contained within a housing or drum 19 loosely mounted at the side of the trap on the end of the operating shaft 20. This housing or drum is provided with a handle or other operating means 21, and contains a motor-spring which is disposed around the shaft 20 and has one end secured to said shaft and its opposite end secured to the drum. The side of the drum adjacent the trap is provided with an annular series of notches 22 engaged by a pawl 23 secured to the side of the trap, so that when the spring is wound by rotating the drum it will be held under tension by engagement of the said pawl with one of said notches to prevent reverse rotation of the said drum. The shaft 20 is provided at its inner end with a crank arm or lever 24, and said crank arm or lever is connected by a link 25 with the crank arm or lever 14 on the shaft 13 which carries the trigger door.

When the trigger or hook 12 is released from the trigger door through the efforts of the animal to abstract the bait, the motor-spring will at once expand and thereby rotate the shaft 20, so that the link 25 will pull the lever or crank arm 14 rearwardly and thereby raise the trigger door and simultaneously lower the entrance door, as previously stated. When the trigger door is raised, it will assume the position shown in dotted lines in Fig. 3, and its free edge will then rest upon the spring catch 26, which is suitably secured within the trap and has its upper end extending horizontally to provide a supporting shoulder for the trigger door and provided with a longitudinal slot 27 which is engaged by a trip pin 28 formed on the pivot or shaft 29 which carries a trap door 30, as shown. The normal position of this spring catch 26 is that shown in Fig. 3, in which its upper end will project in position to be engaged by the free end of the trigger door, and the main portion of the catch projects into the path of movement of the said trigger door, so that it will yield to the upward movement of the same and will be projected under the edge thereof by its own resiliency to support the door in its raised or open position. The slot 27 in the said catch permits it to ride past the trip pin 28 when it is forced rearwardly by the upwardly swinging movement of the trigger door. The trap door 30 is to be operated by the animal in its efforts to escape, and as it is swung upwardly the trip pin 28 will engage the rear end of the slot 27 and thereby act upon the upper end of the catch to withdraw the same from under the trigger door and permit said door to return to its initial position under the action of the motor spring.

The action of the trap as thus far described is thought to be readily understood.

The animal passing through the open front end of the trap will be attracted by the bait and in his efforts to abstract the same or feed thereon will release the trigger door, which will at once be swung to its raised position and thereby close the front or entrance door. The animal being thus distracted from the bait will attempt to escape from the trap but will find the front end closed and will then pass from the front compartment to the intermediate compartment between the trigger door and the trap door. He will then notice the trap door and passing to the same will raise it and pass into the compartment at the rear end of the trap, the trap door falling to its initial normal position as soon as the animal passes from under it. The animal will then be trapped between the rear end of the cage and the said door 30 and may be kept therein until the owner of the trap frees him.

To enlarge the capacity of the trap, I prefer to provide an extension 31, which is similar in construction to the main portion of the trap and is disposed parallel therewith, extending from the rear to the front end thereof and communicating with the rear compartment of the trap through the side of the same, as will be readily understood. This extension is one elongated compartment capable of accommodating a number of animals, in which they may freely move about so as to attract additional animals to the trap. Said extension or compartment is equipped at its front end with an outlet door 32 which is held normally closed by any convenient form of latch, indicated at 33, so that the escape of the animal will be prevented.

The space between the longitudinal partition 18 and the side of the trap constitutes a bait chamber within the front compartment of the trap, and a door 34 is provided to extend across the front side of this bait chamber and thereby prevent the animal feeding on the bait while he is in the front compartment of the trap, so that he will be forced to expend his efforts entirely in an attempt to escape, which will cause him to pass into the intermediate compartment, as before stated. This door 34 is connected with the trigger door by a spring 35 which is put under tension when the trigger door is raised, so that the said door 34 will thereby be drawn against the body of the animal and will cause him to withdraw from the bait. A spring 36 is provided around the hinge of the door 34 and is attached to the said door, so that it will automatically open the same when the tension of the spring 35 is reduced or released, the spring 36 being weaker than the spring 35 when the latter is under tension, so that the door may be easily closed, but sufficiently strong to prevent the door striking forcibly against the animal and thereby injuring him so that he will be hampered in his efforts to pass to the rear of the trap. When the trigger door is lowered the tension of the spring 35 will, of course, be reduced, and the spring 36 will then be free to open the door so that the trap will be ready to receive another animal. A suitable handle 37 is provided on the top of the cage so that the trap may be carried from place to place or the cage lifted from its base when it is desired to clean or repair the trap.

While I have illustrated and heretofore described the trigger door as being operated by the animal pushing against the trap door, I do not limit myself to such an arrangement, and in Fig. 6 have illustrated a modified trip, in which the upper end of the spring catch is engaged by the upper end of an arm 38 rising from a rock-shaft 39 journaled upon the bottom of the trap and carrying a tilting platform or plate 40. The platform or plate 40 is normally inclined upwardly and rearwardly, and when the animal steps upon the same, it will be swung downwardly so that he will exert a pull upon the spring catch and withdraw it from under the trigger door, which will at once return to its initial position and thereby prevent escape of the animal from the intermediate compartment of the trap.

It will be readily noted from the foregoing description, taken in connection with the accompanying drawings, that I have provided a trap of simple construction which will be found highly efficient in catching animals, and will operate automatically after having once been set and baited.

The motor-spring in the casing 19 tends to constantly rotate the shaft 20 and thereby vibrate the trigger door and the entrance door through the levers 9 and 14 and their connections. The said doors should be of such weight as to counterbalance so that when the trigger door is released by the trigger or by the catch 26, the spring will at once actuate the doors easily and smoothly.

Prongs 41 may be provided upon the bottom of the trap below the door 30 to coact with said door in resisting the efforts of the animal to return and to force him to remain beyond the trap door.

Having thus described my invention, what I claim and desire to secure by Letters Patent is:—

1. A trap comprising a series of communicating compartments, closures for the several compartments, means for simultaneously operating some of said closures, a bait chamber in one of the compartments, a movable closure for said bait chamber, and means whereby said closure will operate simultaneously with the closure of the compartment.

2. A trap comprising a series of communicating compartments, closures for the several compartments, means for simultaneously operating some of said closures, a bait chamber in one of the compartments, a movable closure for said bait chamber, and connections between the closure for the bait chamber and the closure for the entrance to the compartment whereby the said closures will operate simultaneously.

3. A trap comprising an entrance compartment and a compartment communicating therewith, an entrance door adapted to close the front end of the entrance compartment, a trigger door movable within the communicating compartment adapted to cut off communication between the two compartments when the entrance door is open, means for automatically operating the said doors, yieldable means for holding the trigger door normally closed, means to engage said door and retain it in an open position, and means at the exit of the compartment containing said door for releasing said retaining means.

4. In a trap having a series of communicating compartments, the combination of a trigger door controlling communication between two of said compartments, means for normally holding said door in a closed position, a yieldable support adapted to be engaged by said door in its open position, and means for releasing said support from the said door.

5. In a trap having a series of communicating compartments, a trigger door controlling the entrance to one of said compartments, a trap door controlling the egress from said compartment, means for holding the trigger door normally in a closed position, means for automatically opening said trigger door upon release of said holding means, a yieldable catch adapted to engage the trigger door in its open position, and means whereby said catch will be withdrawn from the trigger door when the trap door is opened.

6. In a trap having a series of communicating compartments, the combination of a trigger door controlling the entrance to one of said compartments, a trap door controlling the egress from said compartment, means for holding the trigger door normally closed, means for automatically opening the trigger door upon release of said holding means, a spring catch projecting normally into the path of movement of the trigger door and provided with a longitudinal slot in its upper end, and a trip pin carried by the trap door and engaging said slot.

7. In a trap having a series of communicating compartments, a bait chamber formed within one of said compartments, a trigger door controlling the communication between said compartment and the adjacent compartment, a door within said compartment arranged to close the bait chamber, yieldable means for opening said door, and a yieldable connection between the trigger door and the door of the bait chamber, whereby when the trigger door is opened the bait chamber door will be closed.

8. In a trap having an internal bait chamber, a door mounted to close said chamber, means for yieldably holding said door open, and other yieldable means for closing said door when the trap is sprung.

9. In a trap having a series of compartments communicating endwise longitudinally of the trap, vertically swinging doors disposed at the entrance ends of the several compartments, crank arms formed on the outer ends of the pivots of two of said doors, a link connecting said crank arms, a crank shaft mounted in the trap, a link connecting said crank shaft with one of the said crank arms, a motor spring connected with said crank shaft, means engaging one of the inner doors to hold the said doors normally in set position, means for releasing said holding means, a yieldable support adapted to be engaged by said door to retain the same in sprung position, and means actuated by a third door to release said yieldable support.

10. In a trap having a series of communicating compartments, a door controlling communication between two of the said compartments, a bait chamber arranged within one of said compartments, a pivoted door arranged to close said bait chamber, a spring coiled around the pivot of said door and bearing upon the door to hold it normally open, and a weaker spring connecting said door with the door between the compartments whereby when communication between the compartments is opened the bait chamber will be closed.

In testimony whereof I affix my signature in presence of two witnesses.

THOMAS J. BURKE. [L. S.]

Witnesses:
R. M. SALVANT,
G. H. MAIER.

---

Copies of this patent may be obtained for five cents each, by addressing the "Commissioner of Patents, Washington, D. C."